(12) United States Patent
Kim et al.

(10) Patent No.: US 8,867,528 B2
(45) Date of Patent: Oct. 21, 2014

(54) METHOD AND APPARATUS FOR SWITCHING PACKET/TIME DIVISION MULTIPLEXING (TDM) INCLUDING TDM CIRCUIT AND CARRIER ETHERNET PACKET SIGNAL

(75) Inventors: Hong Ju Kim, Daejeon (KR); Ji Wook Youn, Daejeon (KR); Bup Joong Kim, Daejeon (KR); Hyun Jae Lee, Daejeon (KR); Jae Hoon Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 283 days.

(21) Appl. No.: 12/883,396

(22) Filed: Sep. 16, 2010

(65) Prior Publication Data

US 2011/0142036 A1 Jun. 16, 2011

(30) Foreign Application Priority Data

Dec. 16, 2009 (KR) .................. 10-2009-0125330
Feb. 4, 2010 (KR) .................. 10-2010-0010253

(51) Int. Cl.
*H04L 12/66* (2006.01)

(52) U.S. Cl.
USPC ........... 370/352; 370/356; 370/389; 370/463; 370/466

(58) Field of Classification Search
USPC .................. 370/352, 356, 389, 463, 466
See application file for complete search history.

(56) References Cited

U.S. PATENT DOCUMENTS

| | | | |
|---|---|---|---|
| 6,963,561 B1 | 11/2005 | Lahat | |
| 2002/0075854 A1* | 6/2002 | Kumar et al. | 370/352 |
| 2004/0076168 A1* | 4/2004 | Patenaude | 370/406 |
| 2004/0208554 A1* | 10/2004 | Wakai et al. | 398/54 |
| 2005/0220059 A1* | 10/2005 | DelRegno et al. | 370/337 |
| 2007/0071029 A1* | 3/2007 | White et al. | 370/466 |
| 2008/0187009 A1* | 8/2008 | Kim et al. | 370/517 |
| 2008/0260382 A1* | 10/2008 | Okazaki | 398/45 |
| 2008/0304511 A1* | 12/2008 | Yoshimura | 370/463 |
| 2009/0175278 A1* | 7/2009 | Harel et al. | 370/395.1 |
| 2009/0262737 A1* | 10/2009 | Wan et al. | 370/389 |

FOREIGN PATENT DOCUMENTS

| | | | |
|---|---|---|---|
| JP | 2003-60603 | 2/2003 | |
| KR | 20050019266 | * 3/2005 | H04L 12/56 |
| KR | 10-0799804 | 1/2008 | |

* cited by examiner

*Primary Examiner* — Khaled Kassim

(74) *Attorney, Agent, or Firm* — Nelson Mullins Riley & Scarborough LLP; Anthony A. Laurentano, Esq.; Dipti Ramnarain, Esq.

(57) ABSTRACT

Provided is a packet/TDM switch that may classify a type of a received signal based on slot recognition information received from an Ethernet mapping unit or a TDM mapping unit, and may process the received signal using a dedicated switch corresponding to each of the Ethernet mapping unit and the TDM mapping unit according to the type of the received signal.

2 Claims, 8 Drawing Sheets

METHOD AND APPARATUS FOR SWITCHING PACKET/TIME DIVISION MULTIPLEXING (TDM) INCLUDING TDM CIRCUIT AND CARRIER ETHERNET PACKET SIGNAL

CROSS-REFERENCE TO RELATED APPLICATIONS

This application claims the benefit of Korean Patent Application No. 10-2009-0125330, filed on Dec. 16, 2009, and Korean Patent Application No. 10-2010-0010253, filed on Feb. 4, 2010, in the Korean Intellectual Property Office, the disclosures of which are incorporated herein by reference.

BACKGROUND

1. Field of the Invention

The present invention relates to a combined switch and a switching method, and more particularly, to a packet/Time Division Multiplexing (TDM) switch that may accept a TDM circuit and a carrier Ethernet signal, and a method for packet/TDM switching.

2. Description of the Related Art

A conventional Multi-Service Provisioning Platform (MSPP) apparatus may employ a Time Division Multiplexing (TDM) switch as a basic switch and convert an Ethernet signal to a Synchronous Digital Hierarchy (SDH) signal using an Ethernet over SDH (EoS) function, and thereby enable the Ethernet signal to be accepted in the TDM switch.

Also, a carrier Ethernet transport network apparatus scheduled to be applied to a service provider network may employ a packet switch as a basic switch and convert a TDM signal to a packet signal using a Circuit Emulation over Packet (CEP) function, and thereby enable the TDM signal to be accepted in the packet switch.

Currently, a carrier Ethernet transport network is being changed from being based on a TDM circuit signal to being based on a packet signal. Accordingly, there is a need to maintain a circuit performance of an existing TDM scheme and to maintain an advantage of the packet signal transferable without a limitation.

However, the existing MSPP apparatus has an inefficiency of limiting a transfer of an Ethernet packet signal. The carrier Ethernet transport network apparatus may deteriorate the existing performance of the TDM signal by packetizing the TDM signal.

SUMMARY

An aspect of the present invention provides a packet/Time Division Multiplexing (TDM) switch that may include, in an apparatus, a function of switching between a signal of a TDM circuit and a packet signal that is a carrier Ethernet signal, and thereby enables a line card function to be used for both TDM and carrier Ethernet, and may not deteriorate a performance of both signals.

Another aspect of the present invention provides a packet/TDM switch that may maintain a compatibility with an existing equipment by applying an Ethernet over SDH (EoS) processing function or a Circuit Emulation over Packet (CEP) processing function with respect to a predetermined amount of traffic requiring a mutual conversion between packet traffic and TDM traffic.

According to an aspect of the present invention, there is provided a packet/TDM switch including: a packet/TDM selector to classify a type of a received signal into an Ethernet packet signal received from the Ethernet mapping unit and a TDM signal received from the TDM mapping unit, based on slot recognition information received from an Ethernet mapping unit or a TDM mapping unit; a packet switch to switch, to the TDM signal, a signal required to be converted to the TDM signal among Ethernet packet signals; a TDM switch to switch, to the Ethernet packet signal, a signal required to be converted to the Ethernet packet signal among TDM signals; and a converter to perform a mutual conversion between the Ethernet packet signal and the TDM signal.

According to another aspect of the present invention, there is provided a method for packet/TDM switching, including: receiving slot recognition information from an Ethernet mapping unit or a TDM mapping unit; classifying a type of a received signal based on the slot recognition information; and processing the received signal using a dedicated switch corresponding to each of the Ethernet mapping unit and the TDM mapping unit according to the type of the received signal.

EFFECT

According to embodiments of the present invention, while maintaining a performance according to an existing Time Division Multiplexing (TDM) scheme and transferring a packet without a limitation, it is possible to switch between a carrier Ethernet signal and a TDM circuit signal within an apparatus.

Also, according to embodiments of the present invention, it is possible to mutually switch between a signal of a TDM circuit and a packet signal of carrier Ethernet without deteriorating a performance of the signals, and to maintain a compatibility with an existing equipment.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
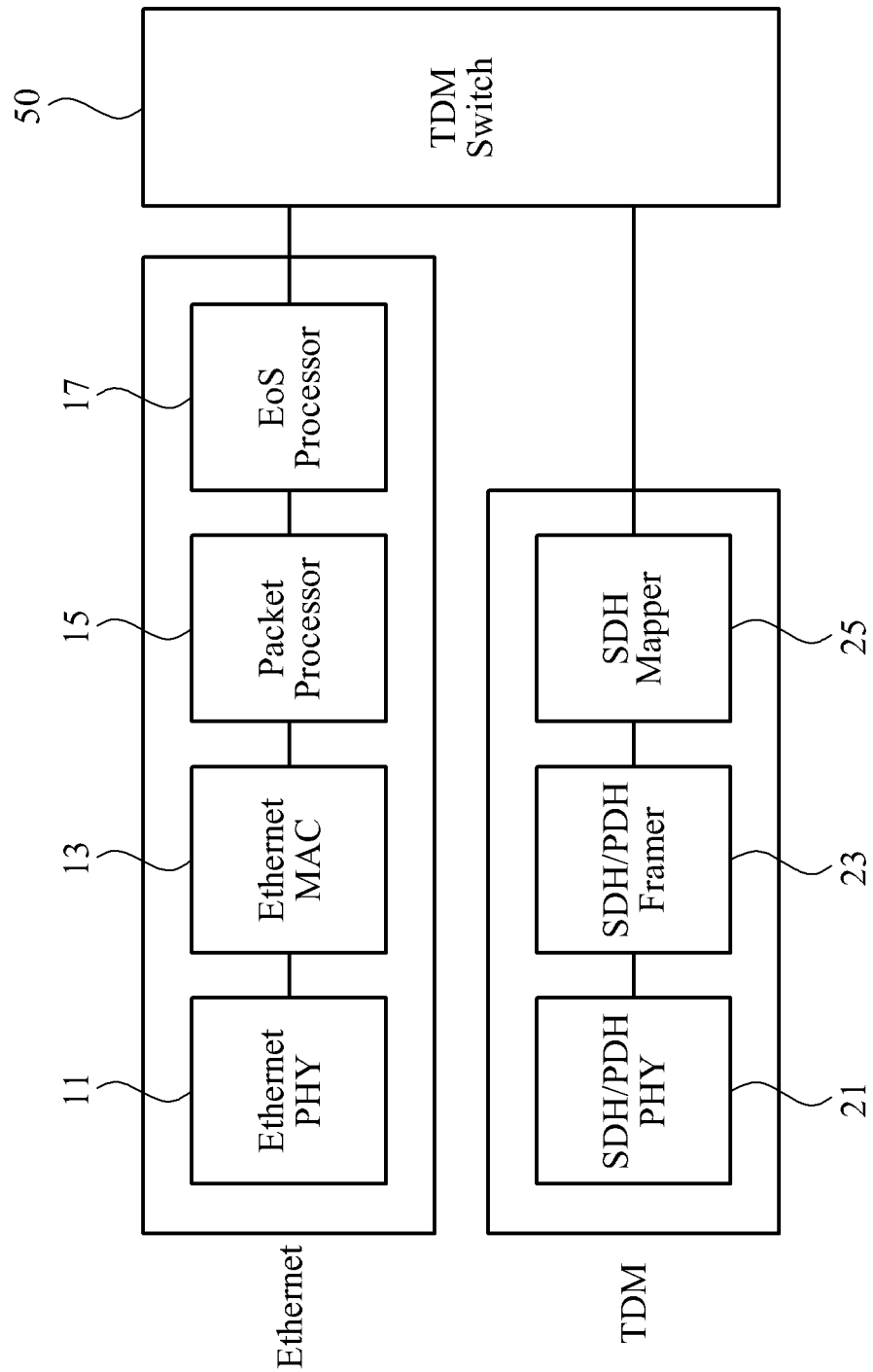
FIG. 1 is a diagram illustrating a Multi-Service Provisioning Platform (MSPP) apparatus according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described with reference to the accompanying drawings.

Figure 2:
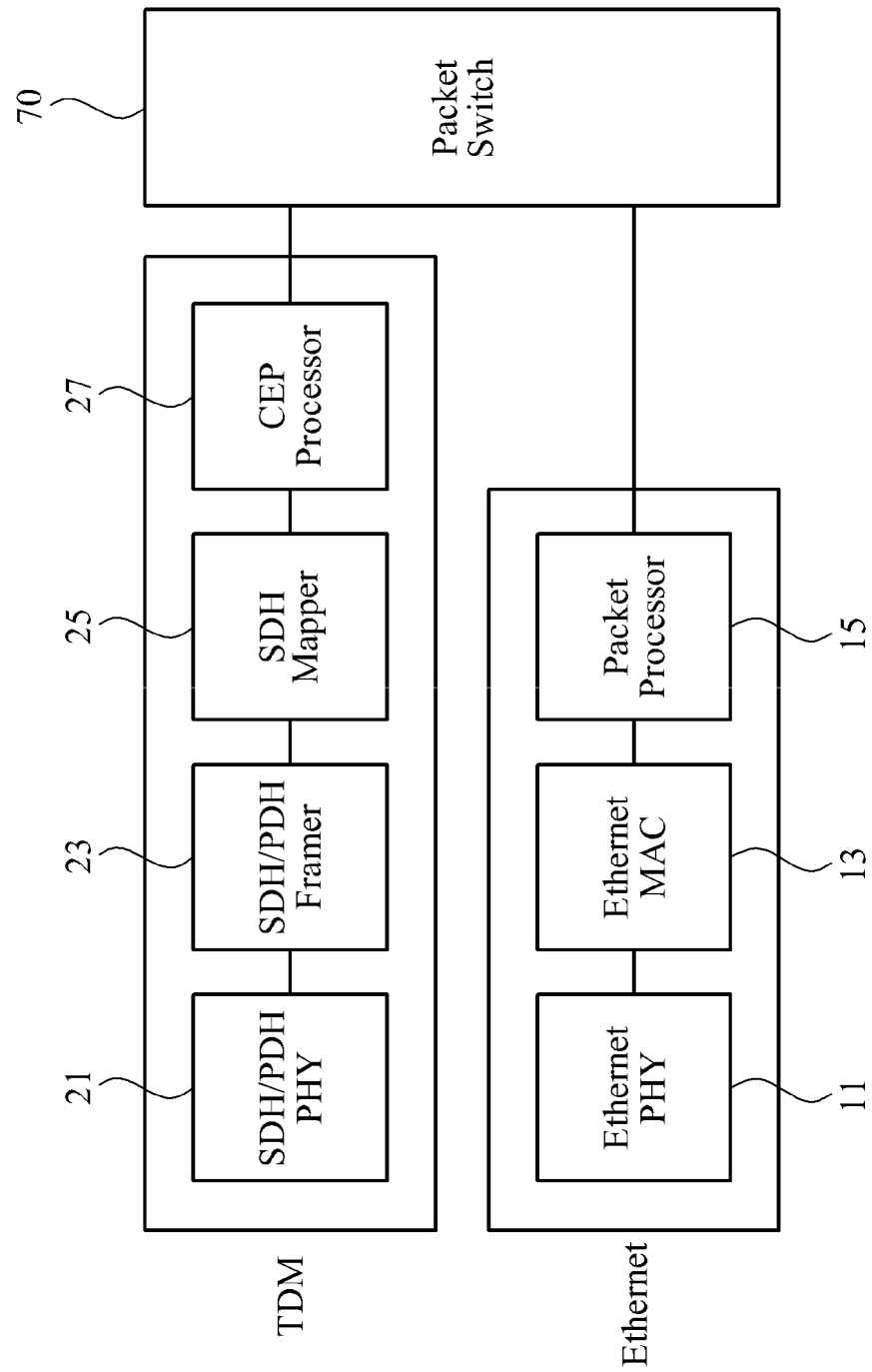
FIG. 2 is a diagram illustrating a carrier Ethernet transport network apparatus according to the related art.

FIG. 1 is a diagram illustrating a Multi-Service Provisioning Platform (MSPP) apparatus according to a related art, and FIG. 2 is a diagram illustrating a carrier Ethernet transport network apparatus according to the related art.

Here, input and output signals may use an Ethernet signal, for example, 100 baseT, GbE, 10 GbE, and the like, and a Time Division Multiplexing (TDM) signal, for example, Plesiochronous Digital Hierarchy (PDH) series of T1 (1.544 Mb/s class) signal, an E1 (2.048 Mb/s class) signal, Synchronous Digital Hierarchy (SDH) series of a Synchronous Transfer Mode (STM)-1 (155 Mb/s class) signal, an STM-16 (2.5 Gb/s class) signal, an STM-64 (10 Gb/s class) signal, and the like.

Referring to FIG. 1, in the case of a path of an Ethernet signal, an Ethernet physical layer (PHY) 11 may provide a physical interface function depending on whether a transmission medium is a twist pair cable or an optical fiber.

An Ethernet Media Access Control (MAC) 13 may receive, from the Ethernet PHY 11, a signal encoded using a line coding scheme, decode the encoded signal and then remove, in the signal, an Inter Packet Gap (IPG), a preamble, a Start Flag Delimiter (SFD), and the like. The Ethernet MAC 13 may adapt only a remaining MAC payload using a first in first out (FIFO) scheme.

A packet processor 15 may perform a layer 2 step switch function, a traffic handler function, and the like.

An Ethernet over SDH (EoS) processor 17 may convert an Ethernet packet signal to an SDH frame. The converted SDH frame may be transferred to another line card using a switching function of a TDM switch 50.

In the case of a path of a TDM signal to be provided to the TDM switch 50, an SDH/PDH PHY 21 may provide a physical interface function depending on whether the transfer medium is the twist pair cable or the optical fiber, which is the same as the Ethernet PHY 11.

An SDH/PDH framer 23 may process overhead by searching for a corresponding frame.

An SDH mapper 25 may complete an SDH frame by adding corresponding overhead to the SDH frame.

The SDH frame formed as above may be transferred to another line card using the switching function of the TDM switch 50.

In the carrier Ethernet transport network apparatus of FIG. 2, an Ethernet signal may be transferred to an Ethernet MAC 13 via an Ethernet PHY 11. The Ethernet PHY 11 may provide a physical interface function depending on whether a transmission medium is a twist pair cable or an optical fiber.

The Ethernet MAC 13 may receive a signal encoded using a line coding scheme, decode the encoded signal and then remove, in the signal, an IPG, a preamble, an SFD, and the like. The Ethernet MAC 13 may adapt only a remaining MAC payload using a FIFO scheme.

Also, a packet processor 15 may perform a layer 2 step switch function, a traffic handler function, and the like. A packet frame formed as above may be transferred to another line card using a switching function of a packet switch 70.

In the case of a path of a TDM signal, when an SDH/PDH PHY 21 provides a physical interface function depending on whether the transfer medium is the twist pair cable or the optical fiber, an SDH/PDH framer 23 may process overhead by searching for a corresponding frame.

Next, the SDH mapper 25 may complete an SDH frame by adding corresponding overhead to the SDH frame. SDH series of the TDM signal formed as above may be converted to a packet through a CEP processor 27.

The finally converted packet may be transferred to the other line card using the switching function of the packet switch 70.

As described above, the MSPP apparatus may include the EoS processor 17 to accept the Ethernet signal, and the carrier Ethernet transport network apparatus may include the CEP processor 27 to accept the TDM signal.

The MSPP apparatus and the carrier Ethernet transport network apparatus having opposite characteristics may deteriorate a performance of a source signal instead of sufficiently showing advantages of a particular signal.

Specifically, since the carrier Ethernet transport network apparatus includes the packet switch 70 as a basic switch and converts a TDM signal to a packet signal using a CEP function, an existing performance of the TDM signal may be deteriorated.

Also, since the MSPP apparatus includes the TDM switch 50 as a basic switch and converts an Ethernet packet signal to a TDM signal using an EoS function, existing statistical multiplexing of a packet signal may be deteriorated. Also, it may increase a performance deterioration and a limit on a transfer of the packet signal.

Figure 3:
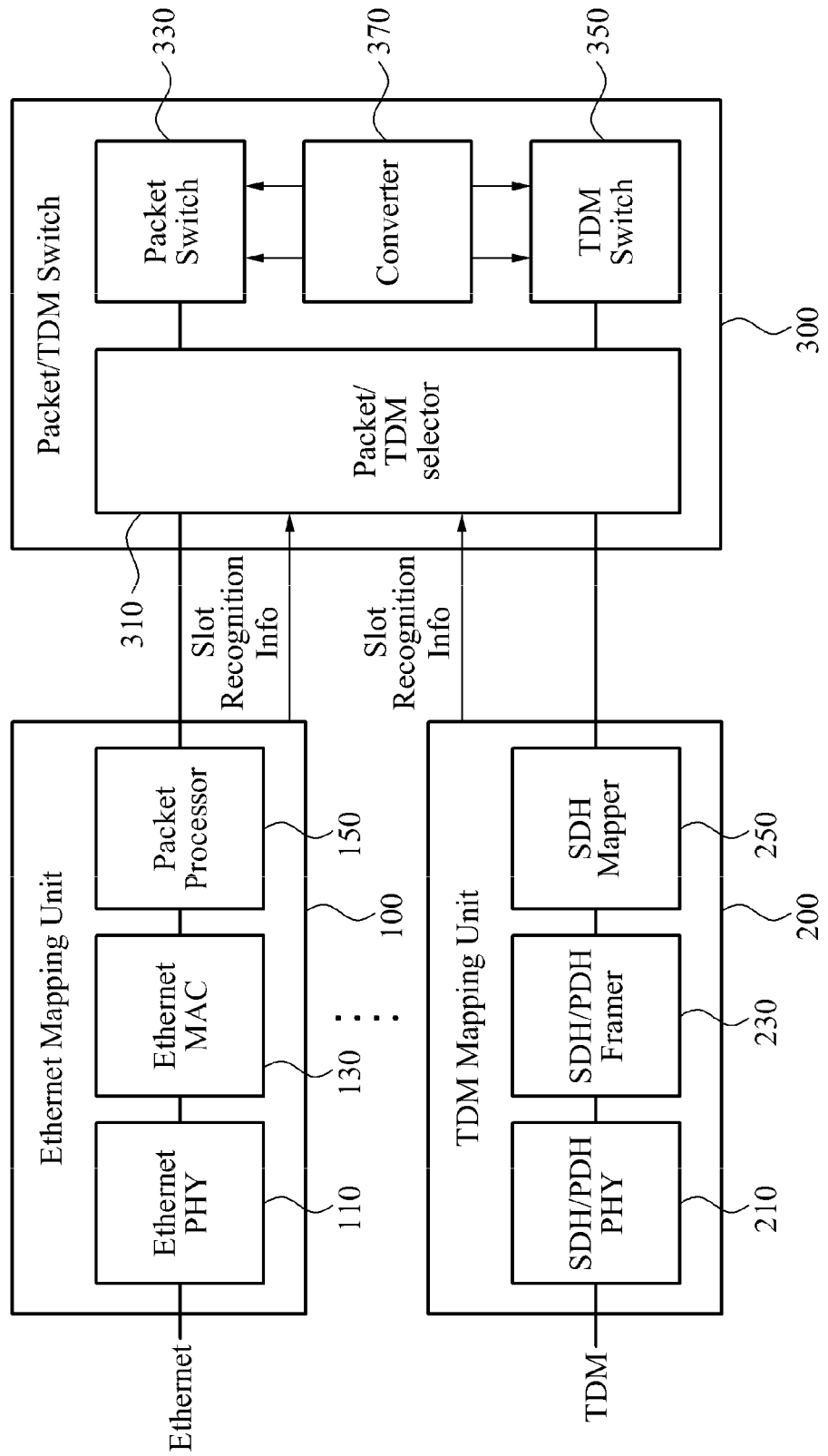
FIG. 3 is a packet/Time Division Multiplexing (TDM) switch including Ethernet and a TDM circuit according to an embodiment of the present invention.
Figure 4:
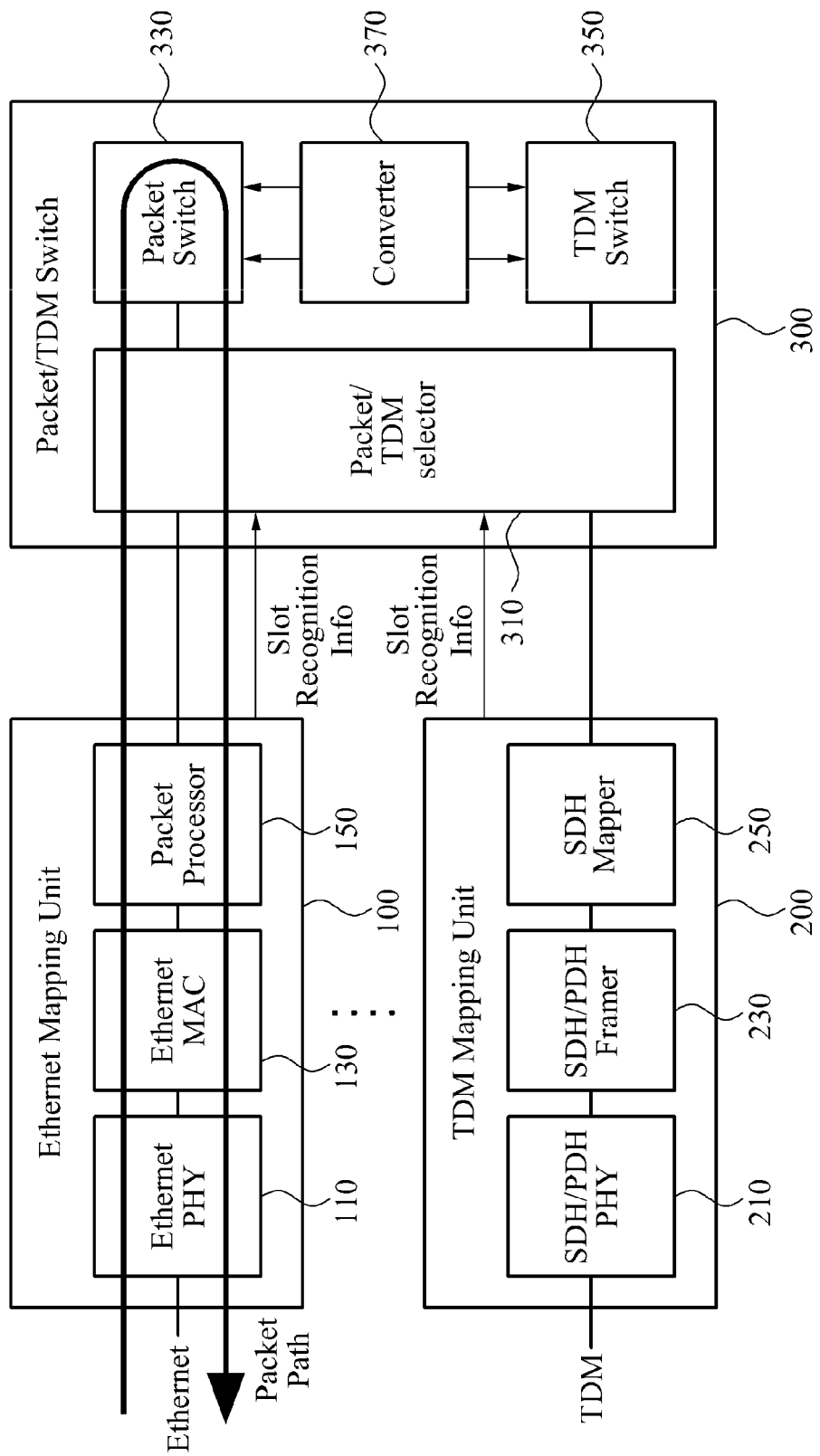
FIG. 4 is a diagram illustrating a flow of a packet signal of FIG. 3.
Figure 5:
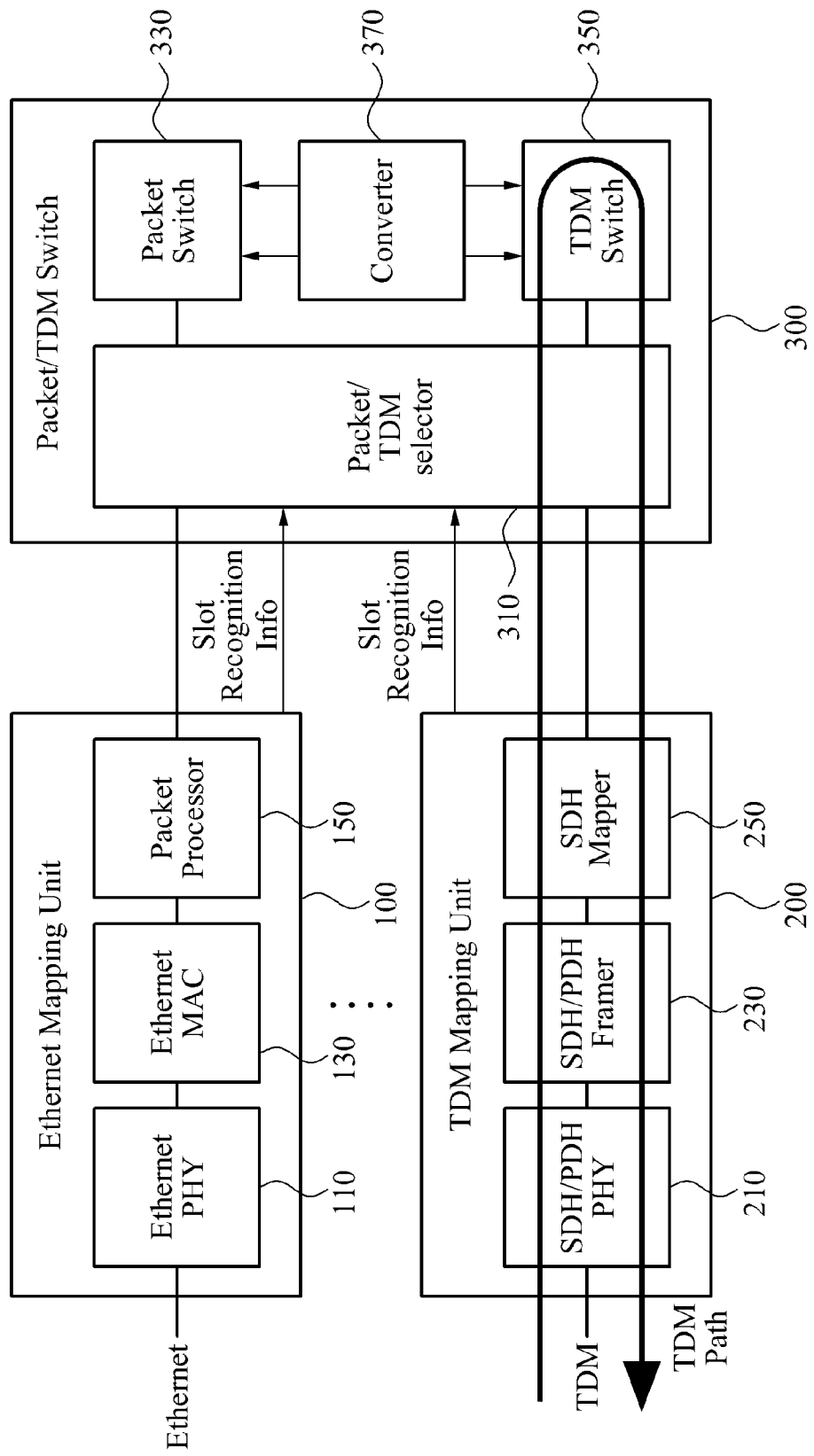
FIG. 5 is a diagram illustrating a flow of a TDM signal of FIG. 3.

FIG. 3 is a packet/TDM switch 300 accepting Ethernet and a TDM circuit according to an embodiment of the present invention. FIG. 4 is a diagram illustrating a flow of a packet signal of FIG. 3, and FIG. 5 is a diagram illustrating a flow of a TDM signal of FIG. 3.

Referring to FIG. 3, the packet/TDM switch 300 accepting Ethernet and the TDM circuit may classify a type of a received signal based on slot recognition information received from an Ethernet mapping unit 100 or a TDM mapping unit 200.

The packet/TDM switch 300 may process the received signal using a dedicated switch, for example, a packet switch 330 or a TDM switch 350, corresponding to each of the Ethernet mapping unit 100 and the TDM mapping unit 200 according to the type of the received signal.

For this, the packet/TDM switch 300 may include a packet/TDM selector 310, the packet switch 330, the TDM switch 350, and a converter 370.

The packet/TDM selector 310 may classify the received signal into an Ethernet packet signal and a TDM signal based on the slot recognition information received from the Ethernet mapping unit 100 or the TDM mapping unit 200.

The Ethernet packet signal may be received from the Ethernet mapping unit 100 and the TDM signal may be received from the TDM mapping unit 200.

Among Ethernet packet signals received from the packet/TDM selector 310, the packet switch 330 may switch a signal required to be output to the Ethernet mapping unit 100, or may switch a signal required to be converted to the TDM signal.

Also, among TDM signals received from the packet/TDM selector 310 may switch a signal required to be output to the TDM mapping unit 200, or may switch a signal required to be converted to the Ethernet packet signal.

The converter 370 may perform a mutual conversion between the Ethernet packet signal and the TDM signal that are received from the packet switch 330 and the TDM switch 350.

In this instance, the converter 370 may use an EoS function or a CEP function for the mutual conversion between the Ethernet packet signal and the TDM signal. A configuration of the converter 370 performing the EoS function or the CEP function will be described with reference to FIGS. 6 and 7.

The packet/TDM switch 300 may have a complex switch function capable of switching between a signal of the TDM circuit and a packet signal that is a carrier Ethernet signal in an apparatus.

Accordingly, regardless that a function of a line card is TDM or carrier Ethernet, the packet/TDM switch 300 may perform switching between TDM and Ethernet, and may accept the TDM signal of the TDM circuit and the packet signal of the carrier Ethernet without deteriorating a performance of signals.

Also, the packet/TDM switch 300 may perform interoperation through an EoS processing function or a CEP processing function with respect to a predetermined amount of traffic requiring the mutual conversion between the packet signal (traffic) and the TDM signal (traffic), and thus may maintain a compatibility with an existing equipment Hereinafter, an operation among the Ethernet mapping unit 100, the TDM mapping unit 200, and the packet/TDM switch 300 will be described.

An Ethernet signal or a carrier Ethernet signal may be transferred from an Ethernet PHY 110 of the Ethernet mapping unit 100 to an Ethernet MAC 130 using a physical interface function.

The physical interface function of the Ethernet PHY 110 may vary depending on whether a transfer medium is a twist pair cable or an optical fiber.

The Ethernet MAC 130 may receive a signal encoded using a line coding scheme, decode the encoded signal and then remove, in the signal, an IPG, a preamble, an SFD, and the like.

The Ethernet MAC 130 may adapt only a remaining MAC payload using a FIFO scheme.

A packet processor 150 may perform a layer 2 step switch function, a traffic handler function, and the like with respect to the adapted MAC payload received from the Ethernet MAC 130.

Here, the Ethernet mapping unit 100 may be configured as a single line card.

Also, the TDM signal may be transferred from an SDH/PDH PHY 210 of the TDM mapping unit 200 to an SDH/PDH framer 230 using the physical interface function.

The SDH/PDH framer 230 may process overhead by searching for a corresponding frame.

An SDH mapper 250 may complete an SDH frame by adding, to the SDH frame, the overhead processed by the SDH/PDH PHY 230.

Here, the TDM mapping unit 200 may be configured as a single line card.

Thus, according to an embodiment of the present invention, the packet/TDM switch 300 may be combined with two types of line cards, for example, the Ethernet mapping unit 100 and the TDM mapping unit 200.

The packet/TDM selector 310 may determine whether a line card of a corresponding port corresponds to the Ethernet mapping unit 100 or the TDM mapping unit 200, based on slot recognition information. A signal received via a line card such as the Ethernet mapping unit 100 or the TDM mapping unit 200 may be transferred to a corresponding dedicated switch according to a type of the received signal.

Switching of the signal (traffic) received from the Ethernet mapping unit 100 may be performed using only the packet switch 330. Also, switching of the signal (traffic) received from the TDM mapping unit 200 may be performed using only the TDM switch 350. Accordingly, it is possible to prevent a performance of a corresponding signal from being deteriorated.

The converter 370 may perform a mutual conversion, that is, mutual switching with respect to a predetermined amount of signal (traffic) requiring a conversion, that is, switching between both signals between the packet switch 330 and the TDM switch 350.

FIG. 4 is a diagram illustrating a flow of a packet signal of FIG. 3

Referring to FIG. 4, in the case of a path of an Ethernet signal, the Ethernet signal or a carrier Ethernet (for example, Provider Backbone Traffic Engineering (PBB-TE) and Multi-Protocol Label Switch-Transport Profile (MPLS-TP)) signal may be provided to the packet/TDM switch 300 via the Ethernet mapping unit 100.

The packet/TDM selector 310 may determine whether a line card of a corresponding port corresponds to the Ethernet mapping unit 100 or the TDM mapping unit 200, based on slot recognition information.

Next, the packet/TDM selector 310 may transfer a signal received via the line card to a corresponding dedicated switch according to a type of the received signal.

Since switching of a signal (traffic) received from the Ethernet mapping unit 100 is performed using only the packet switch 330, the received signal may be transferred again to the Ethernet mapping unit 100 using a switching function without deteriorating a performance of the signal.

FIG. 5 is a diagram illustrating a flow of a TDM signal of FIG. 3.

Referring to FIG. 5, in the case of a path of the TDM signal, an SDH frame that is the TDM signal completed passing through the TDM mapping unit 200 may be provided to the packet/TDM switch 300.

The packet/TDM selector 310 may determine whether the received signal is received from the Ethernet mapping unit 100 or the TDM mapping unit 200, based on slot recognition information.

When the received signal is determined to be received from the TDM mapping unit 200, the packet/TDM selector 310 may transfer the received signal to the TDM switch 350.

As described above, since switching of the signal received from the TDM mapping unit 200 is performed using only the TDM switch 350, the received signal may be transferred again to the TDM mapping unit 200 using a switching function without deteriorating a performance of the received signal.

Figure 6:
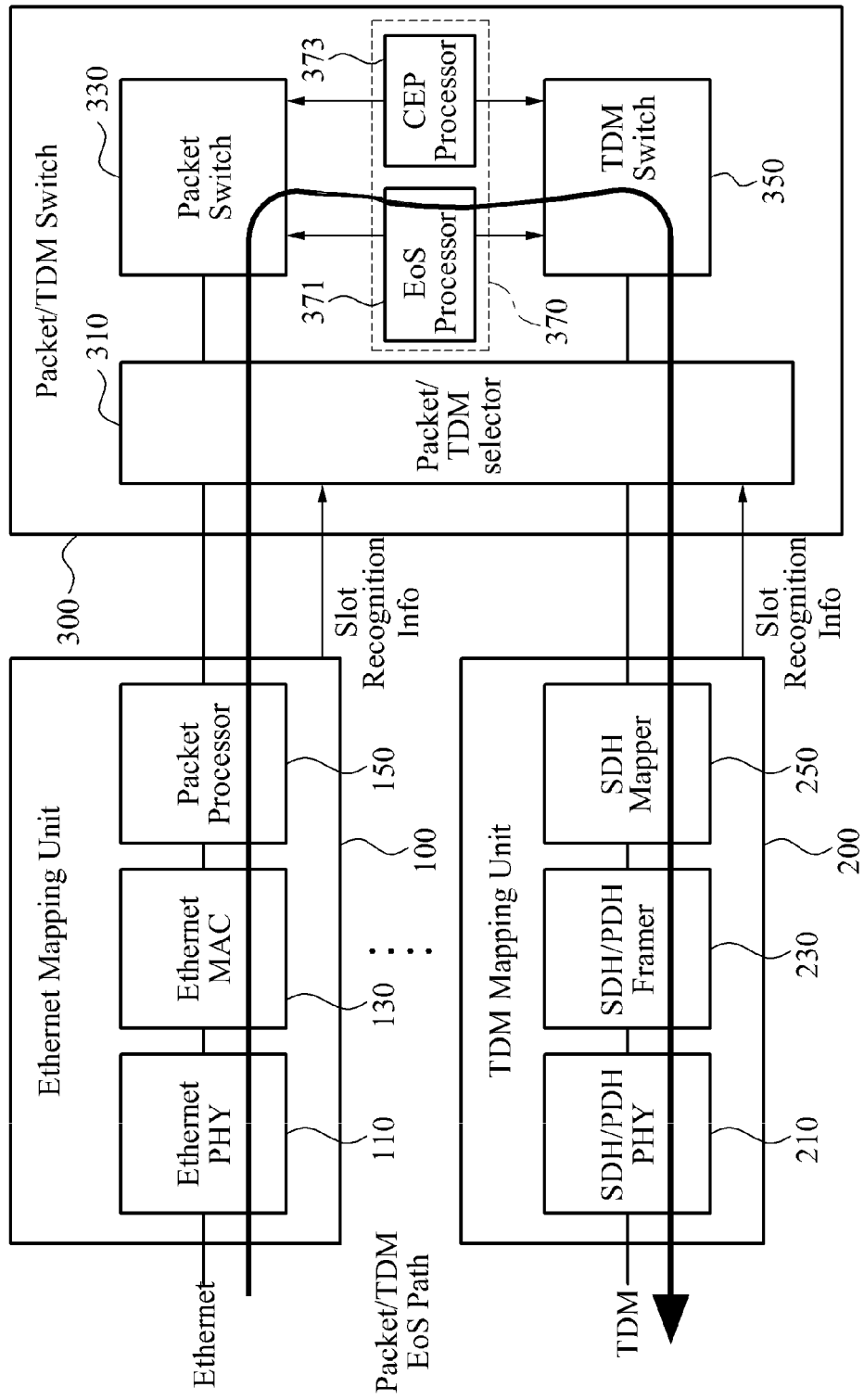
FIG. 6 is a diagram illustrating a data flow using an Ethernet over SDH (EoS) processor in a packet/TDM switch according to an embodiment of the present invention.

FIG. 6 is a diagram illustrating a data flow using an EoS processor 371 in the packet/TDM switch 300 according to an embodiment of the present invention.

Referring to FIG. 6, an Ethernet or carrier Ethernet (for example, PBB-TE and MPLS-TP) signal may be transferred to the packet/TDM switch 300 via the Ethernet mapping unit 100 including the Ethernet PHY 110, the Ethernet MAC 130, and the packet processor 150.

An operation of the Ethernet mapping unit 100 is the same as described above with reference to FIG. 3 and thus further detailed descriptions will be omitted here.

The packet/TDM selector 310 may classify a type of a signal received from the Ethernet mapping unit 100 based on slot recognition information.

When the signal is received from the Ethernet mapping unit 100, the packet/TDM selector 310 may transfer the signal to a packet switch 300.

The packet switch 330 may transfer, to the EoS processor 371 of the converter 370 via a corresponding switch port, a signal required to be converted to a TDM signal among Ethernet packet signals, that is, a signal (traffic) requiring an EoS function.

The EoS processor 371 may convert an Ethernet MAC payload of an Ethernet packet signal to an SDH frame.

For this, although not illustrated, the EoS processor 371 may include a Generic Framing Procedure (GFP) framer, a Virtual Concatenation (VCAT) controller, a Link Capacity Adjustment Scheme (LCAS) controller, an SDH mapper, and the like.

The GFP framer may form the Ethernet MAC payload into a GFP frame by encapsulating the Ethernet MAC payload.

The VCAT controller may perform a function of virtually concatenating the GFP frame and a time slot of the SDH frame. Specifically, the VCAT controller may allocate the GFP frame formed by the GFP framer to the time slot of the SDH frame.

The LCAS controller may dynamically allocate a band of the GFP frame to the time slot. Finally, the SDH mapper may convert the GFP frame to the SDH frame by adding overhead to the GFP frame. Here, the GFP frame may be allocated to the time slot of the SDH frame.

The SDH frame formed as above may be transferred to the TDM switch 350, and then be transferred to the TDM mapping unit 200 using a TDM switching function.

Figure 7:
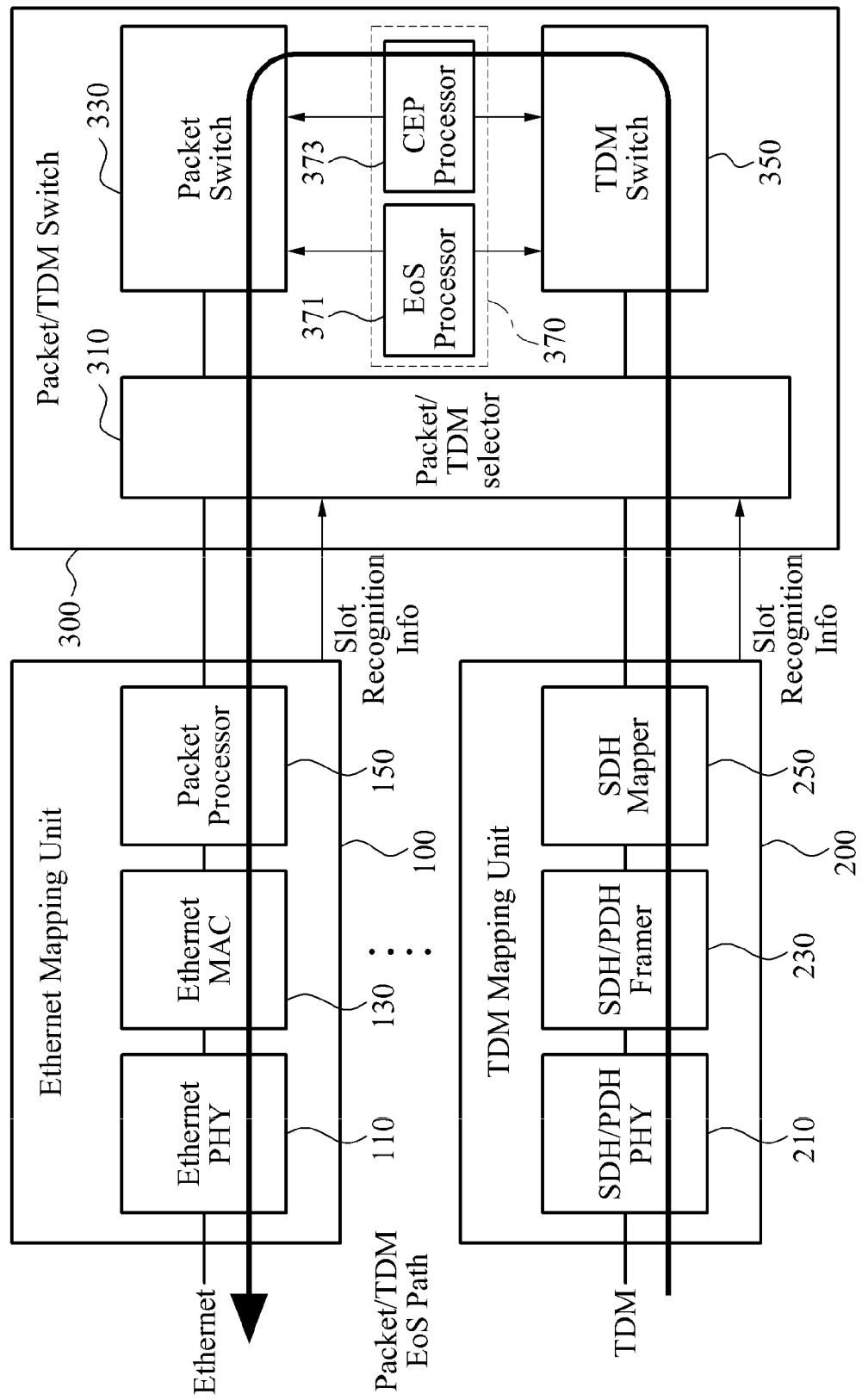
FIG. 7 is a diagram illustrating a data flow using a Circuit Emulation over Packet (CEP) processor in a packet/TDM switch according to an embodiment of the present invention.

FIG. 7 is a diagram illustrating a data flow using a CEP processor 373 in the packet/TDM switch 300 according to an embodiment of the present invention.

Referring to FIG. 7, a TDM signal may be transferred to the packet/TDM switch 300 via the TDM mapping unit 200 including the SDH/PDH PHY 210, the SDH/PDH framer 230, and the SDH mapper 250.

An operation of the TDM mapping unit 200 is the same as described above with reference to FIG. 3 and thus further detailed descriptions will be omitted here.

An SDH frame received from the TDM mapping unit 200 may be transferred to the packet/TDM switch 300.

The packet/TDM selector 310 may classify a type of a received signal based on slot recognition information, and may transfer the received signal to a corresponding dedicated switch according to the type of the received signal.

In this example, since an SDH frame is received from the TDM mapping unit 200, the received signal may be transmitted to the TDM switch 350.

The TDM switch 350 may transfer, to the CEP processor 373 of the converter 370 via a corresponding TDM switch port, a signal required to be converted to an Ethernet packet signal among TDM signals.

The CEP processor 373 may convert the SDH frame of the TDM signal to a packet.

For this, although not illustrated, the CEP processor 373 may include an SDH interface unit, a packetization unit, a packet interface unit, and the like.

SDH series of a TDM signal may pass through the SDH interface unit and convert a time slot such as a virtual container within the SDH frame to a packet using the packetization unit.

The time slot packetized by the packetization unit may be transferred to the packet switch 330 via the packet interface unit and be transferred to the Ethernet mapping unit 100 using a switching function of the packet switch 330.

Figure 8:
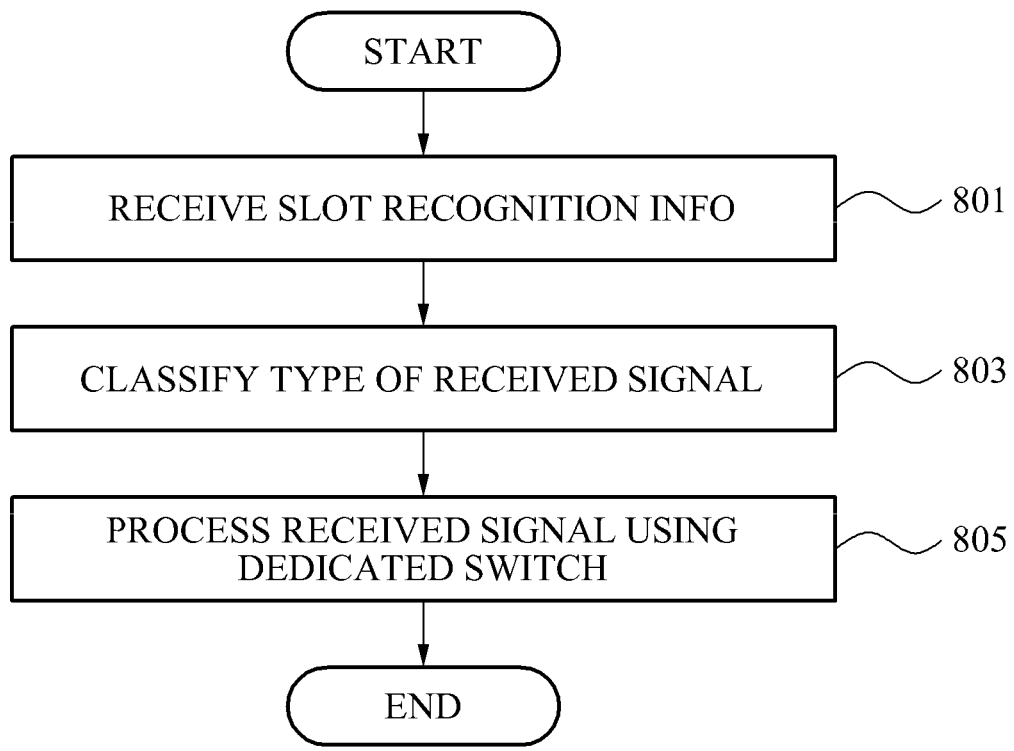
FIG. 8 is a flowchart illustrating a method for packet/TDM switching according to an embodiment of the present invention.

FIG. 8 is a flowchart illustrating a method for packet/TDM switching according to an embodiment of the present invention.

Referring to FIG. 8, the method for packet/TDM switching may receive slot recognition information from an Ethernet mapping unit or a TDM mapping unit in operation 801, and may classify a type of a received signal based on the slot recognition information in operation 803.

The signal classified in operation 803 may be an Ethernet packet signal received from the Ethernet mapping unit, or may be a TDM signal received from a TDM mapping unit.

In operation 805, the received signal may be processed using a dedicated switch corresponding to each of the Ethernet mapping unit and the TDM mapping unit according to the type of the received signal. For example, in the case of the Ethernet mapping unit, the dedicated switch may be a packet switch. In the case of the TDM mapping unit, the dedicated switch may be a TDM switch.

Also, in operation 805, among Ethernet packet signals received from the Ethernet mapping unit, a signal required to be converted to a TDM signal used in the TDM mapping unit may be switched to the TDM signal. Also, among TDM signals received from the TDM mapping unit, a signal required to be converted to an Ethernet packet signal used in the Ethernet mapping unit may be switched to the Ethernet packet signal. After this, a mutual conversion between the Ethernet packet signal and the TDM signal may be performed.

In this instance, an EoS function or a CEP function may be used for the mutual conversion between the Ethernet packet signal and the TDM signal.

A process of performing the mutual conversion may include a process of converting an Ethernet MAC payload of the Ethernet packet signal to an SDH frame of the TDM signal and a process of converting the SDH frame of the TDM signal to a packet.

In this instance, the process of converting the Ethernet MAC payload to the SDH frame may be performed when converting the Ethernet packet signal to the TDM signal. The process of converting the SDH frame of the TDM signal to the packet may be performed when converting the TDM signal to the Ethernet packet signal.

Hereinafter, the process of converting the Ethernet MAC payload to the SDH frame will be further described.

Initially, the Ethernet MAC payload switched from the packet switch may be encapsulated and thereby be formed into a GFP frame. The GFP frame may be allocated to a time slot of the SDH frame. Next, a band of the GFP frame may be allocated to the time slot. A conversion to the SDH frame may be performed by adding overhead to the GFP frame allocated to the time slot. In this instance, the SDH frame may be provided to the TDM mapping unit via the TDM switch.

Hereinafter, the process of converting the SDH frame of the TDM signal to the packet will be further described. The SDH frame of the TDM signal may be received from the TDM switch. The time slot within the SDH frame may be converted to the packet and the converted packet may be transmitted to the packet switch. The transmitted packet may be provided to the Ethernet mapping unit.

The aforementioned packet/TDM switching method may include operations performed by the packet/TDM switch 300 described above with reference to FIGS. 3 through 7.

Accordingly, descriptions made above with reference to FIGS. 3 through 7 may be applicable to the packet/TDM switching method.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A converter in a packet-time division multiplexing (TDM) switch, wherein the converter employs an Ethernet over SDH (EoS) function and a Circuit Emulation over Packet (CEP) function for a mutual conversion between an Ethernet packet signal and a TDM signal,
    wherein the converter is provided between a packet switch and a TDM switch in the packet-TDM switch;
    wherein the converter comprises: an EoS processor to convert a Media Access Control (MAC) payload of the Ethernet packet signal to a Synchronous Digital Hierarchy (SDH) frame of the TDM signal; and a CEP processor to convert the SDH frame of the TDM signal to a packet;
    wherein the EoS processor comprises: a Generic Framing Procedure (GFP) framer to form the Ethernet MAC payload into a GFP frame by encapsulating the Ethernet MAC payload;
    a Virtual Concatenation (VCAT) controller to allocate the GFP frame to a time slot of the SDH frame;
    a Link Capacity Adjustment Scheme (LCAS) controller to allocate a band of the GFP frame to the time slot;
    and an SDH mapper to convert the GFP frame to the SDH frame by adding overhead to the GFP frame allocated to the time slot of the SDH frame,
    wherein the CEP processor comprises:
    an SDH interface unit to receive the SDH frame of the TDM signal;
    a packetization unit to convert a time slot of the SDH frame to a packet; and
    a packet interface unit to transmit the packet.

2. A method for converting in a packet-TDM switch, comprising:
    converting, to a TDM signal, a signal required to be converted to the TDM signal among Ethernet packet signals, and converting, to an Ethernet packet signal, a signal required to be converted to the Ethernet packet signal among TDM signals; and
    performing a mutual conversion between the Ethernet packet signal and the TDM signal using an Ethernet over SDH (EoS) function and a Circuit Emulation over Packet (CEP) function,
    wherein the converting is provided between a packet switch and a TDM switch in the packet-TDM switch;
    wherein the performing of the mutual conversion comprises:
    performing the EoS function of converting a MAC payload of the Ethernet packet signal to an SDH frame of the TDM signal; and
    performing the CEP function of converting the SDH frame of the TDM signal to a packet;
    wherein the performing of the EoS function comprises:
    forming the Ethernet MAC payload into a OFP frame by encapsulating the Ethernet MAC payload;
    allocating the OFP frame to a time slot of the SDH frame;
    allocating a band of the OFP frame to the time slot;
    and converting the OFP frame to the SDH frame by adding an overhead to the OFP frame allocated to the time slot of the SDH frame,
    wherein the performing of the CEP function comprises:
    receiving the SDH frame of the TDM signal; converting a time slot of the SDH frame to a packet; and
    transmitting the packet.

* * * * *